(12) United States Patent
Foley et al.

(10) Patent No.: US 6,487,590 B1
(45) Date of Patent: Nov. 26, 2002

(54) METHOD FOR CONTROLLING A NETWORK ELEMENT FROM A REMOTE WORKSTATION

(75) Inventors: Michael P. Foley, Elmwood Park, IL (US); Kurt A. Vangsness, Aurora, IL (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/184,101

(22) Filed: Oct. 30, 1998

(51) Int. Cl.[7] ............................................. G06F 15/173
(52) U.S. Cl. ..................... 709/223; 709/217; 709/224; 709/229; 709/315; 709/316
(58) Field of Search ................................ 709/217, 223, 709/224, 229, 235, 232, 233, 315, 316

(56) References Cited

U.S. PATENT DOCUMENTS

| | | | |
|---|---|---|---|
| 5,109,486 A | * 4/1992 | Seymour ..................... 709/203 |
| 5,491,796 A | 2/1996 | Wanderer et al. |
| 5,621,892 A | * 4/1997 | Cook ........................... 709/224 |
| 5,655,081 A | * 8/1997 | Bonnell et al. .............. 709/701 |
| 5,740,368 A | * 4/1998 | Villalpando ................. 709/202 |
| 5,796,633 A | * 8/1998 | Burgess et al. .............. 702/187 |
| 5,802,146 A | * 9/1998 | Dulman ........................ 379/34 |
| 5,812,750 A | * 9/1998 | Dev et al. ....................... 714/4 |
| 5,822,569 A | * 10/1998 | McPartlan et al. ...... 395/500.42 |
| 5,941,945 A | * 8/1999 | Aditham et al. ............. 709/205 |
| 5,961,594 A | * 10/1999 | Bouvier et al. ............. 709/223 |
| 5,987,513 A | * 11/1999 | Prithviraj et al. ........... 709/223 |
| 6,003,078 A | * 12/1999 | Kodimer et al. ............. 709/224 |
| 6,012,095 A | * 1/2000 | Thompson et al. .......... 709/231 |
| 6,049,828 A | * 4/2000 | Dev et al. .................... 709/224 |
| 6,058,103 A | * 5/2000 | Henderson et al. .......... 370/254 |
| 6,101,498 A | * 8/2000 | Scaer et al. .................... 707/10 |
| 6,105,061 A | * 8/2000 | Nakai .......................... 709/223 |
| 6,192,034 B1 | * 2/2001 | Hsieh et al. ................. 370/241 |

FOREIGN PATENT DOCUMENTS

EP            0 831 617 A2          3/1998

OTHER PUBLICATIONS

Magedanz T. et al.: "Intelligent Agents an Emerging Technology for Next Generation Telecommunications?" Proceedings of Infocom, US, Los Alamitos, IEEE Comp. Soc. Press, vol. Conf. 15, 1996, pp. 464–472.

Kotschenreuther, J.: Betreiber Brauchen Offene Netzmanagementsysteme: NTZ Nachrichtentechnische Zeitschrift, DE, VDE, Verlag GMBH., Berlin, vol. 50, No. 5, Jan. 1, 1997.

"Design for a Simple Network Management Protocol Subagent for Internet Firewalls" IBM Technical Disclosure Bulletin, US, IBM Corp. New York, vol. 40, No. 3, Mar. 1, 1997, pp. 63–68.

* cited by examiner

Primary Examiner—Saleh Najjar
(74) Attorney, Agent, or Firm—Grossman, Patti & Brill

(57) ABSTRACT

A method is provided for controlling a network element from a client at a remote work station connectable to the network, the network, element is registered for attributes to be tracked, and attributes associated with the network element are polled only if the client requests the monitoring of the network element.

75 Claims, 8 Drawing Sheets

FIG. 4

| USER SESSION MANAGER (UserSession) | IN ITS CURRENT FORM, THE PRIMARY FUNCTION OF THE USER SESSION MANAGER IS TO MAINTAIN A LIST OF ACTIVE CLIENT SESSIONS AND APPLICATIONS. IN SUBSEQUENT RELEASES, THIS SERVICE OBJECT WILL PROVIDE USER ACCESS SECURITY ON A NETWORK-ELEMENT AND OPERATION BASIS. REFER TO THE SECTION ON SESSION MANAGEMENT FOR A DISCUSSION OF THE INTERFACES PROVIDED BY UserSession. |
|---|---|
| MANAGED OBJECT (MO) | FOR EACH PHYSICAL OR LOGICAL RESOURCE WHICH MUST BE MANAGED BY THE EMS, AN ABSTRACT REPRESENTATION WILL BE DEFINED WHICH IDENTIFIES ATTRIBUTES AND OPERATIONS ASSOCIATED WITH THE RESOURCE. EACH APPLICATION-SPECIFIC MANAGED OBJECT IMPLEMENTED ON THE SERVER MUST PROVIDE THE SAME CLIENT INTERFACES FOR RETRIEVING CONFIGURATION INFORMATION, ATTRIBUTE VALUES, AND REGISTRATION FOR NOTIFICATION OF CHANGES., REFER TO THE SECTION ON MANAGED OBJECTS FOR FURTHER DETAILS. |
| NETWORK-ELEMENT LEVEL MANAGED OBJECT (NEMO) | EACH APPLICATION-SPECIFIC NEMO IMPLEMENTED ON THE SERVER MUST PROVIDE ADDITIONAL INTERFACES ABOVE THOSE PROVIDED BY THE STANDARD MANAGED OBJECT TO SUPPORT NETWORK-ELEMENT LEVEL CONFIGURATION QUERIES. REFER TO THE SECTION ON NETWORK ELEMENT LEVEL MANAGED OBJECTS FOR FURTHER DETAILS. |
| EVENT DISTRIBUTOR (EvtDist) | THE EVENT DISTRIBUTOR PROPAGATES EVENTS EITHER RECEIVED OR GENERATED AT THE SERVER TO CLIENTS WHICH REGISTER FILTERS SPECIFYING EVENT FILTER CRITERIA. REFER TO THE SECTION ON THE EVENT DISTRIBUTOR FOR THE DEFINITION OF AN EVENT AND EVENT FILTER, AND A DISCUSSION OF THE CLIENT INTERFACES PROVIDED BY EvtDist. |
| ALARM MANAGER (AlarmManager) | THE PRIMARY UTILITY OF THE ALARM MANAGER IS REALIZED THROUGH A SINGLE CLIENT APPLICATION CALLED THE AlarmList. (NOTE THAT THERE MAY BE MORE THAN ONE INSTANCE OF THE AlarmList APPLICATION ACTIVE AT ANY ONE TIME). ALARM FILTERS MAY BE REGISTERED WHICH FILTER ALARM INFORMATION BASED ON NETWORK ELEMENT, MANAGED OBJECT OF ALARM LEVEL. THE AlarmManager RETURNS AN INITIAL VIEW OR ALL ACTIVE ALARMS MATCHING THE SPECIFIED CRITERIA, AND PROVIDES NOTIFICATION OF CHANGES RESULTING FROM SUBSEQUENT ALARM SET OR CLEAR EVENTS. REFER TO THE SECTION ON THE ALARM MANAGER FOR THE DEFINITION OF AN ALARM AND ALARM FILTER, AND A DETAILED DISCUSSION OF THE CLIENT INTERFACES PROVIDED BY THE AlarmManager. |

FIG. 5

| | |
|---|---|
| MANAGED OBJECT CONFIGURATION CALLBACK (ConfigCB) | A ConfigCB OBJECT MUST IMPLEMENT A deliverConfig( ) METHOD FOR NOTIFICATION OF MANAGED OBJECT CONFIGURATION CHANGES. REFER TO THE SECTION ON MANAGED OBJECTS FOR DETAILS ON THE FORMAT OF REPORTED CONFIGURATION DATA. |
| MANAGED OBJECT STATUS CALLBACK (StatusCB) | A StatusCB OBJECT MUST IMPLEMENT A deliverStatus( ) METHOD FOR NOTIFICATION OF MANAGED OBJECT ATTRIBUTE VALUE CHANGES. REFER TO THE SECTION ON MANAGED OBJECTS FOR DETAILS ON THE FORMAT OF REPORTED STATUS DATA. |
| NETWORK-ELEMENT LEVEL MANAGED OBJECT CONFIGURATION CALLBACK (NEconfigCB) | AN NEconfigCB OBJECT MUST IMPLEMENT A deliverNEconfig( ) METHOD FOR NOTIFICATION OF NETWORK-ELEMENT LEVEL MANAGED OBJECT CONFIGURATION CHANGES. REFER TO THE SECTION ON NETWORK ELEMENT LEVEL MANAGED OBJECTS FOR DETAILS ON THE FORMAT OF REPORTED NETWORK-ELEMENT LEVEL CONFIGURATION DATA. |
| EVENT NOTIFICATION CALLBACK (EventCB) | AN EventCB OBJECT MUST IMPLEMENT A deliverEvent( ) METHOD FOR EVENT NOTIFICATION. REFER TO THE SECTION ON THE EVENT DISTRIBUTOR FOR DETAILS ON THE FORMAT OF REPORTED EVENT DATA. |
| ACTIVE ALARM NOTIFICATION CALLBACK (AlarmCB) | AN AlarmCB OBJECT MUST IMPLEMENT A deliverAlarm( ) METHOD FOR NOTIFICATION OF ACTIVE ALARM CHANGES. REFER TO THE SECTION ON ALARM MANAGER FOR DETAILS ON THE FORMAT OF REPORTED ALARM DATA. |

FIG. 6

| ASN.1 PRIMITIVE AND APPLICATION TYPES SUPPORTED BY SNμPv2 | | |
|---|---|---|
| EMAPI TYPE | ASN.1 TAG OR RFC1155 TYPE | IDL REPRESENTATION |
| ASN1BOOLEAN | BOOLEAN | BOOLEAN |
| ASN1INTEGER | INTEGER | LONG |
| ASN1UNINTEGER | *NOT A TRUE ASN.1 TYPE | UNSIGNED LONG |
| ASN1OCTET | OCTET STRING | SEQUENCE<OCTET> |
| ASN1TIMETICKS | TIMETICKS | UNSIGNED LONG |
| ASN1GAUGE | GAUGE | UNSIGNED LONG |
| ASN1COUNTER | COUNTER | UNSIGNED LONG |
| ASN1IPADDRESS | IPADDRESS | OCTET(4) |
| ASN1NULL | NULL | OCTET |
| ASN1OID | OBJECT IDENTIFIER | SEQUENCE<UNSIGNED LONG> |

| EMS-SPECIFIC TYPES | | |
|---|---|---|
| EMARI TYPE | DESCRIPTION | IDL REPRESENTATION |
| LOGICALID | NETWORK ELEMENT OR MAINTENANCE UNIT LOGICAL IDENTIFIER | ASN1INTEGER |
| CLASSCODE | INTEGER VALUE WHICH UNIQUELY IDENTIFIES MANAGED OBJECT CLASS | LONG |
| INSTID | INTEGER VALUE WHICH UNIQUELY IDENTIFIES AN INSTANCE OF A GIVEN MANAGED OBJECT | UNSIGNED LONG |
| ATTRCODE | INTEGER VALUE WHICH UNIQUELY IDENTIFIES AN ATTRIBUTE OF A GIVEN MANAGED OBJECT | LONG |
| CMDSEQNO | COMMAND SEQUENCE NUMBER | LONG |

FIG. 8

| EVENT CATEGORY | VALID CRITERIA | | | | |
|---|---|---|---|---|---|
| | NETWORK ELEMENT ID | NETWORK ELEMENT ALARM LEVEL | MAINTENANCE UNIT ID | MAINTENANCE UNIT ALARM LEVEL | COMMAND ID |
| ALARM CLEAR | X | X | X | X | |
| ALARM SET | X | X | X | X | |
| COMMAND ACKNOWLEDGMENT | X | | | | X |
| COMMAND RESPONSE | X | | | | X |
| CONFIGURATION CHANGE | X | | X | | |
| INFORMATIONAL MESSAGE | X | | X | | |
| INITIALIZATION | X | | | | |
| STATE CHANGE | X | X | X | | |
| ANY CATEGORY | X | | X | X | X |

FIG. 9

| MNEMONIC | MEANING |
|---|---|
| EM_INVALID_USER | THE USER LOGIN IDENTIFIER IS INVALID. |
| EM_UNKNOWN_HOST | THE SPECIFIED HOST IS UNKNOWN. |
| EM_TOO_MANY_USER_SESSIONS | TOO MANY CLIENT SESSIONS ARE ALREADY ACTIVE. |
| EM_TOO_MANY_APPLICATIONS | TOO MANY CLIENT APPLICATIONS ARE ALREADY ACTIVE FOR THE SPECIFIED LOGIN-HOST COMBINATION. |
| EM_INVALID_SESSION_ID | THE SPECIFIED CLIENT SESSION ID IS INVALID OR NO LONGER KNOWN. |
| EM_INVALID_APP_ID | THE SPECIFIED CLIENT APPLICATION ID IS INVALID OR NO LONGER KNOWN. |
| EM_INVALID_INST_ID | THE SPECIFIED INSTANCE ID IS INVALID (e.g. NULL INSTANCE IS SPECIFIED BUT NOT ACCEPTED IN THE CURRENT APPLICATION CONTEXT). |
| EM_INVALID_NE_ID | THE SPECIFIED NETWORK ELEMENT INSTANCE ID IS INVALID OR NOT LONGER KNOWN. |
| EM_INVALID_MO_ID | THE SPECIFIED MANAGED OBJECT INSTANCE ID IS INVALID OR NO LONGER KNOWN. |
| EM_INVALID_ATTR_CODE | THE SPECIFIED ATTRIBUTE CODE IS NOT DEFINED FOR THE TARGET MANAGED OBJECT. |
| EM_NO_MATCHING_INST | NO MANAGED OBJECT INSTANCE CONTAINS A MATCHING KEY LIST. |
| EM_INVALID_FILTER | THE SPECIFIED FILTER FOR EITHER AN EVENT OR ALARM CONTAINED ONE OR MORE INVALID CRITERIA. |
| EM_INVALID_FILTER_ID | THE SPECIFIED FILTER ID FOR EITHER AN EVENT OR ALARM IS INVALID OR NO LONGER KNOWN. |
| EM_NE_ISOLATED | THE SPECIFIED NETWORK ELEMENT INSTANCE IS ISOLATED. |
| EM_INTERNAL_ERROR | THE REQUEST COULD NOT BE SATISFIED BECAUSE OF AN EMS SERVER ERROR. |
| EM_INVALID_OPERATION | AN INVALID OPERATION WAS ATTEMPTED. |
| EM_ACCESS_DENIED | ACCESS PERMISSION WAS NOT GRANTED FOR THE CURRENT OPERATION REQUEST. |
| EM_VERSION_MISMATCH | SOFTWARE VERSION MISMATCH DETECTED. |
| EM_LOST_RESOURCE | A CRITICAL RESOURCE HAS BEEN LOST SINCE THE LAST CLIENT APPLICATION HEARTBEAT (e.g. AlarmManager ABNORMALLY TERMINATED). |
| EM_INVALID_KEY | AN INVALID KEY SEQUENCE WAS SPECIFIED (e.g. WRONG NUMBER OF LOGICAL ID'S SPECIFIED FOR A TARGET MANAGED OBJECT INSTANCE). |
| EM_INVALID_CATEGORY | AN INVALID EVENT FILTER CATEGORY WAS SPECIFIED. | ized
METHOD FOR CONTROLLING A NETWORK ELEMENT FROM A REMOTE WORKSTATION

A microfiche appendix is included in this application.

BACKGROUND OF THE INVENTION

This invention relates, generally, to a method for controlling a network element and, more particularly, to a method for remotely controlling the network by communications through the network.

Network management systems in which network elements, or management agents, are remotely controlled from a remote, management work station by means of communications between the management work station and the managed network elements sent through the network are known. Such known network management systems employ a special communication protocol for communications between the remote work station running a management program and an element management server that contains a management information base that defines the interface between the work station and the network elements.

Known systems such as (Hewlett Packard HP-OV NNM or DM, Sun Microsystems Solstice) present an interface where the client application must poll the network element when status is needed. In these systems, the polling may not be coordinated and is replicated for each client, if each client is interested in the same attributes. Also, each of the clients receive the full results for each polling cycle (even if there was no change from the last cycle), increasing the bandwidth used to communicate between the client application and the network element, as well as creating additional processing overhead due to the replicated polling at the network element.

SUMMARY OF THE INVENTION

A method is provided for controlling a network element from a remote work station connectable to the network. The method provides for registering the network element for attributes to be tracked, and polling for attributes associated with the network element only if the client requests the monitoring of the network element. Changes in attributes are reported when the client requests notification of changes in attributes. For attributes polled for a plurality of clients, changes in the attributes to one of the plurality of clients requesting notification of changes in the attributes are reported.

The method further provides for polling once for a plurality of clients that registers for the same attributes and reporting asynchronously changes in the attributes to a plurality of clients.

Another aspect of the invention provides for running an object oriented program at the remote work station to control an object associated with the controllable network element, translating interface operations generated by the work station during the running of the object oriented program to corresponding translated interface operations in an object oriented language associated with the object being controlled, and connecting the corresponding translated interface operations through the network to an object server to control the object associated with the network element in accordance with the translated interface operations.

These and other features and advantages of the present invention will become apparent from the following detailed description, the accompanying drawings and the appended claims.

BRIEF DESCRIPTION OF THE DRAWINGS

The foregoing advantageous features will be described in detail and other advantageous features of the invention will be made apparent from the detailed description of the preferred embodiment of the invention that is given with reference to the several figures of the drawings, in which:

FIG. 4 is a table of a plurality of service objects that interact with the client management application run at the work station of FIG. 1;

FIG. 5 is a table of a plurality of call back functions performed at the translating interface of FIG. 2;

FIG. 6 is a table of the different fundamental data types capable of being translated by the translating interface of FIG. 2 in accordance with the invention.

FIG. 8 is a table summarizing filter criteria that is valid for each event category; and FIG. 9 is a table defining specific exceptions with an EMAPI exception code containing one of the listed values.

DETAILED DESCRIPTION

This invention provides an application programming interface (API) and protocol that provides for efficient communication between a distributed client application and an element management server independent of the communication protocol to the network element. The Element Management Application Programming Interface (EMAPI) provides the following benefits over known management system. The invention has application in the management of a telecommunication network element. For more information regarding such a management of a telecommunication network element refer to commonly owned U.S. patent application Ser. No. 09/088,463, entitled "Method for Computer Internet Remote Management of a Telecommunication Network Element" by William E. Barker, Lisa M. Connelly, Marvin A. Eggert, Michael P. Foley, Kenneth R. Macfarlane, Philip M. Parsons, Girish Rai, Jerome E. Rog, and Kurt A. Vangsness, filed on May 31, 1998, now U.S. Pat. No. 6,363,481 the disclosure of which is hereby incorporated by reference.

Efficient use over low bandwidth connections. Client applications register for network element information they wish to track and after an initial set of data only receive incremental updates (deltas) when there are changes.

Centralized polling of attributes. Attributes are only polled if a client exists that has registered to monitor the attribute. If multiple clients register for the same attribute(s), the polling is not repeated for the clients-only a single polling cycle is performed.

Figure 1:
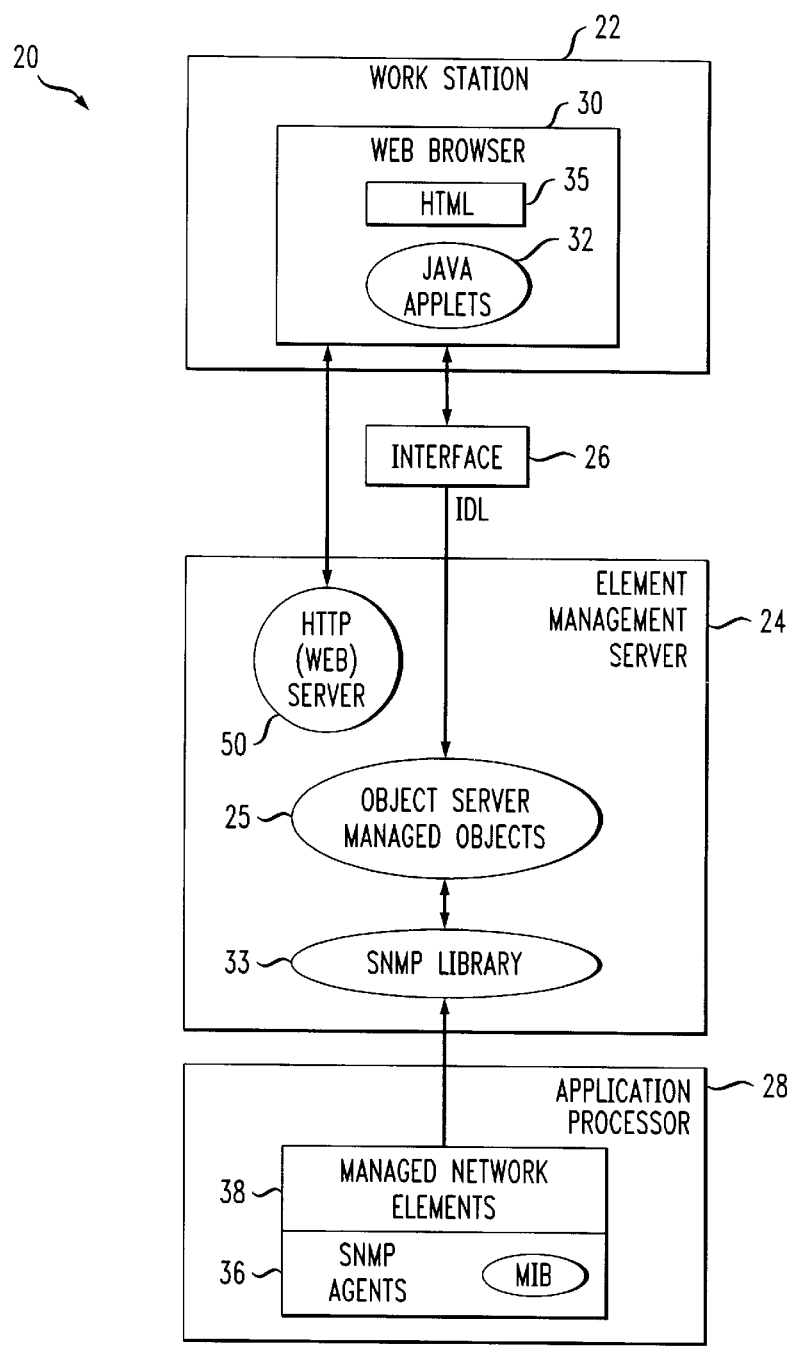
FIG. 1 is a functional block diagram of the preferred embodiment of a management system using the preferred network element control method of the present invention.
Figure 2:
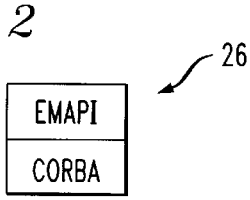
FIG. 2 is a functional block diagram of the preferred embodiment of the translating interface shown as a single functional block in FIG. 1.

The invention is used in an operations, administration and maintenance system 20 as shown in FIG. 1. The system 20 includes a PC or workstation 22, an element management server (EMS) 24, an interface 26 in accordance with the invention, located between the workstation 22 and an object server 25. An application processor 28 is connected to the element management server 24.

The workstation 22 includes a web browser 30 which is the interface to the client and is a host for JAVA applets 32 and web browser HTML 35 which is a hypertext markup language.

The system 20 operates on a cluster computing environment, and leverages off-the-shelf technology to enable additional customers visible features, while extending to subsequent releases and other projects, with minimal increased cost. System 20 is provided through the web browser interface and a SNMP based element management platform.

A client executes application s via web pages at the workstation 22. The client makes requests for various views of the network status by making selections through the web browser 30. The web browser requests pages from the web server 50 which transmits HTML pages that contain instructions to load and run the appropriate JAVA applet 32. Once the applet starts, it communicates with the object server 25 through the interface 26 to perform initialization and to request initial configuration and status information that is appropriate for the current requested view. The JAVA applet 32 then registers with the object server 25 for subsequent notifications of changes to configuration and status that it requires to keep the view up to date. The client may perform commands to request various maintenance operations on the network element(s) 38. These commands are converted into appropriate requests through the interface 26 and perform operations on the object server 25. The commands are then translated into SNMP and are transmitted to the network element(s) 38 through the SNMP library 33. Acknowledgements and command responses from the network element(s) 38 are transmitted through the SNMP library 33, are converted to events by the object server 25 and transmitted to origination JAVA applet 32 through the use of callbacks defined by the interface 26.

Figure 3:
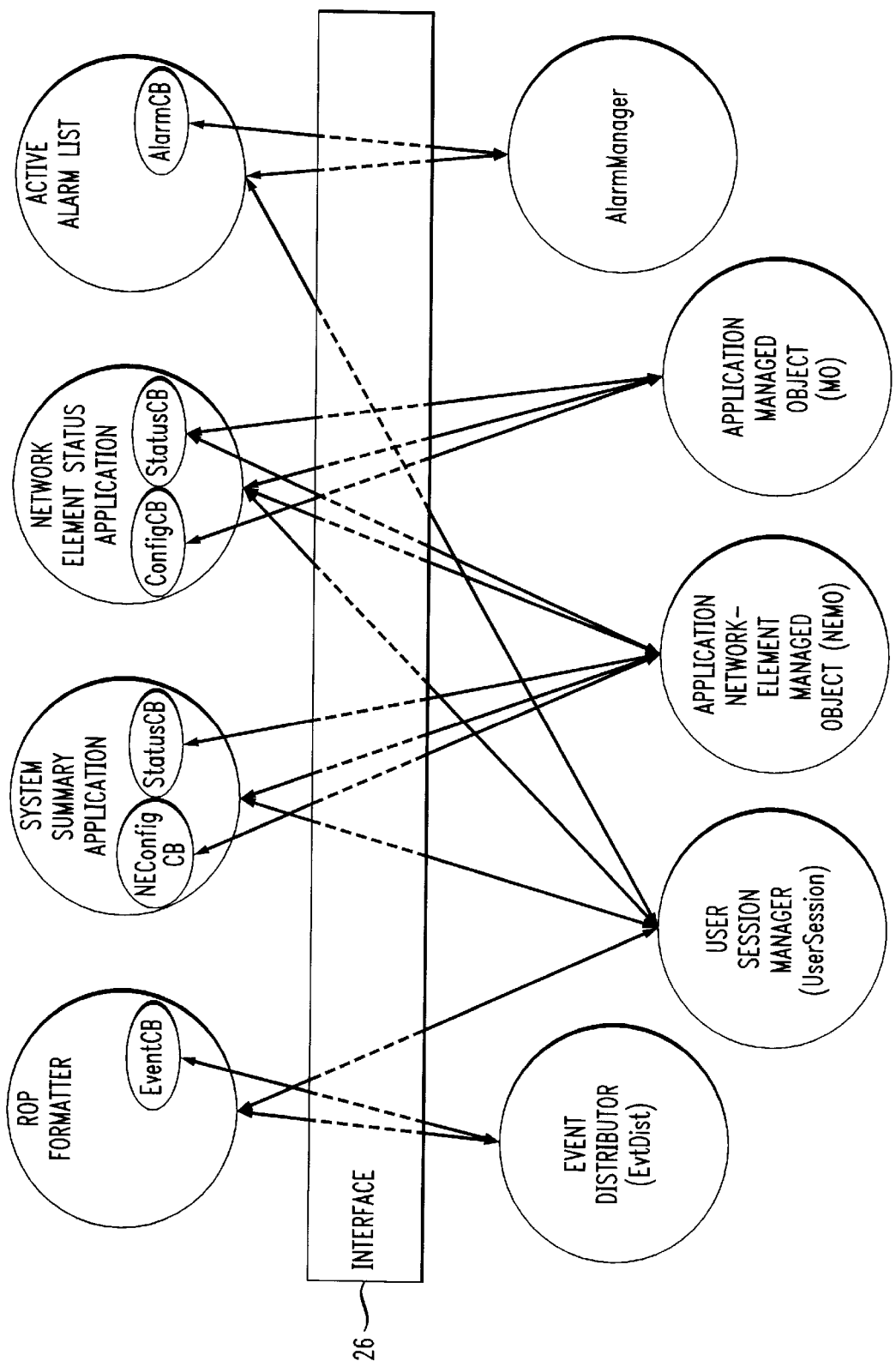
FIG. 3 is a functional block diagram illustrating the interface with the controlled network element that is visible to object oriented client management application at the work station of FIG. 1.

In one embodiment of the invention, as shown in FIG. 3, client applications in JAVA applets 32 include an active alarm list browser, a system alarm survey and a network element detailed status display. Client applications communication with the web server 50 via the interface 26 in accordance with the invention, to the element manager through a distributed object request architecture such as COBRA. The interface 26 provides a constant interface to all managed objects in the network, and hides the implementation details associated with the element manager platform.

The interface 26 (EMAPI) is the definition of objects, attributes and operations that comprise the protocol used between client applications and the server to manage network elements. The EMAPI uses the industry standard CORBA to provide distribution of the objects and their operations and to allow for the implementation of the client and server to be in different programming languages and on different computer architectures.

The client interface to the server and the managed object attributes is described in the interface 26 and managed object notation provides a consistent model of all managed objects in the network, hiding the implementation details associated with the element manager platform from client applications, thus clients do not need to know the underlying protocol to the network elements. Managed objects specific logic is encapsulated within the managed object instead of scattered throughout various applications thus simplifying client application development.

Each physical, selected non-physical and logical component in the network is modeled as a managed object, which the Server makes visible to distributed client applications through the facilities of the Common Object Request Broker Architecture (CORBA). EM clients need only be concerned about the attributes and operations defined for each application managed object, and not the details of network-level protocol and the server infrastructure required to support object services.

EMAPI Object Definition

FIG. 3 illustrates all of the interfaces visible to client applications which does not depict process or processor boundaries, which are made transparent by the client and server object request brokers (ORBs). Application services are provided through object interfaces formally defined in the CORBA Interface Definition Language (IDL). The IDL specification of the interfaces described in this document is provided in the Appendix A.

The service objects resident on the server with which client applications will interact are shown in FIG. 4.

Client applications which register for real-time status updates or notification of events, alarms or configuration changes must provide a reference to a local callback object which the server will use to propagate information asynchronously. The callback interfaces defined in the interface 26 are shown in FIG. 5. Classes which implement these interfaces must be defined and instantiated in client code.

Data Representation

There are several fundamental data types defined in the interface 26, which fall into one of the two categories shown in FIG. 6.

Session Management

Each EM client session is logically associated with a unique login-host combination. Multiple client applications may be associated with the same session, though only one need be registered for the session to be considered active. Session and application identifiers are assigned by the User Session Manager to track resources used by the client, and in future releases, to correlate client access permissions with operation requests. Applications may or may not cross process boundaries. For example, multiple instances of the EMS Command Line Interface (CLI) application registered with the same login and host name will share the same session id, but each process is associated with a different application id. In the EMS Graphical User Interface, all application frames execute in the same process space (albeit in different Threads), yet each frame is associated with a distinct application id. Note that each client application is required to independently register a periodic heartbeat to validate for the Server that its associated resources are still needed.

The UserSession service object provides the following interfaces:

startApplication

This method must be invoked for each client application initialization.

stopApplication

A client invokes this method to notify the Server that a target application is terminating, and its associated resources should be released.

stop

This method may be used to deregister all applications associated with the same session identifier.

heartbeat

This method must be invoked at least every UserSession-::HeartbeatPeriod seconds to avoid a timeout condition which, when detected by a Server audit, will result in the release of all resources utilized by an application.

Refer to the description of interface UserSession in the attachment for additional details.

Managed Objects

Figure 7:
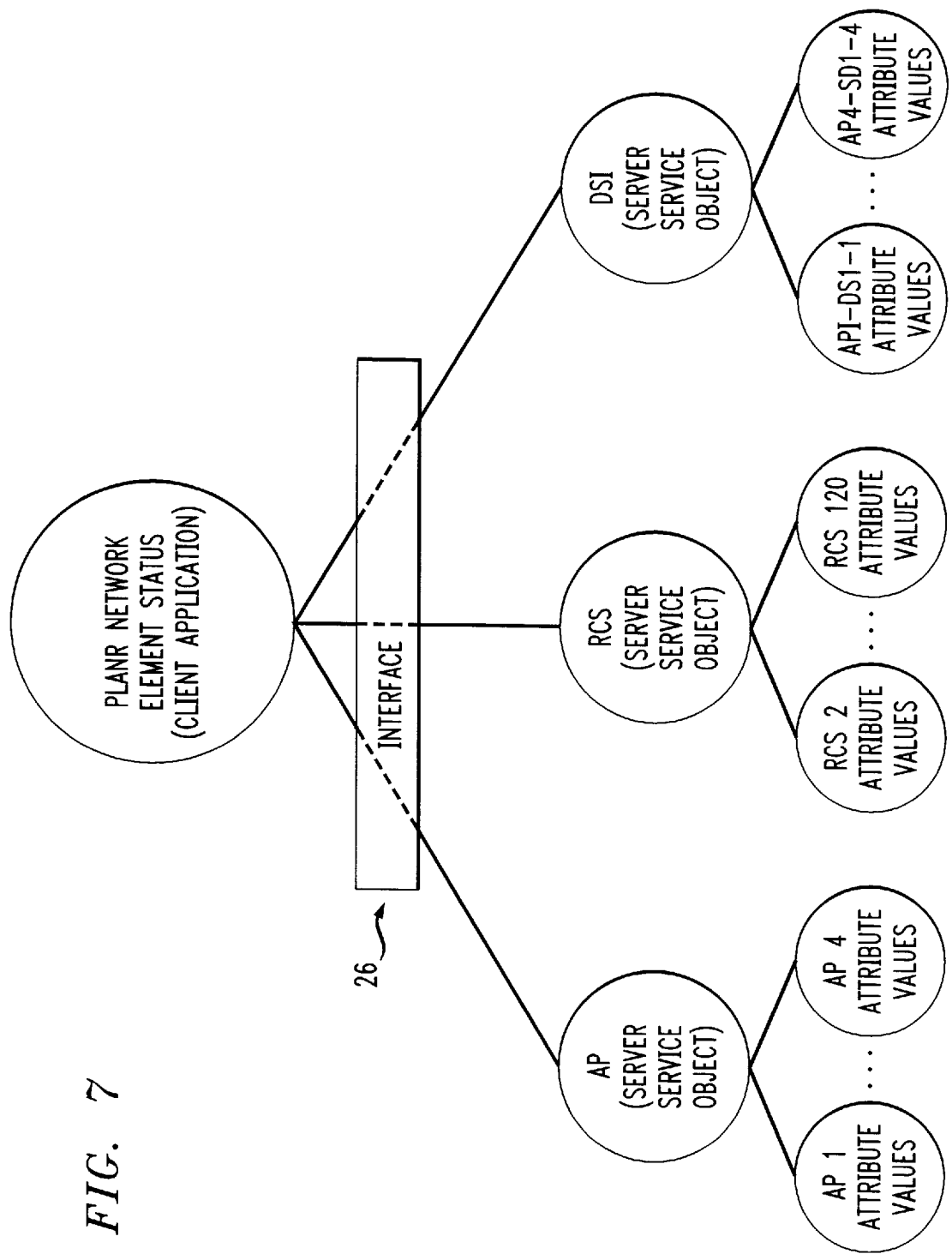
FIG. 7 is a block diagram showing the relationship between client application-specific service object, and the internal service representative of managed object instances.

A managed object (MO) is an abstract representation of a physical or logical resource which may be managed by the EMS, such as a network element, maintenance unit or data link. The EM Server will implement one application-specific service object for each type of physical or logical resource to be managed. Each of these service objects defines a set of attributes which identify managed object properties, as well as the operations which may be performed on a specified managed object instance. (The decision to provide access to instance information through a single "service object" stems from the fact that current ORB implementations become unstable when managing very large numbers of remote references.) FIG. 7 depicts the relationship between Client, application-specific service object, and the internal Server representation of managed object instances.

Each managed object service class is uniquely identified by a ClassCode. Each managed object instance is uniquely identified by an InstId. Any object instance in the system may be uniquely referenced by a managed object identifier (Oid), which is the combination of ClassCode and InstId.

Managed object status information is reported by a service object as a sequence of attribute code-value pairs. Each attribute value is defined as a union of all of the interface 26 fundamental data types described in FIG. 6.

Configuration information is reported as a sequence of ConfigData structures, which are defined to contain:
- network element instance id
- managed object instance id
- a managed object key list reported as a sequence of attribute-value pairs—when length is greater than 0, the key list specifies the associated logical identifiers (LogicalIds)

Each managed object service class must implement the MO interface, which defines the following configuration and status services:

viewConfig

A client uses this method to obtain the current EMS view of the managed object configuration for a specified network element instance. Note that the reserved instance identifier AnyInstance may be used to obtain configuration information for all network elements.

notifyConfig

A client may also register for an initial view of managed object configuration information and notification of subsequent changes via callback. The initial view is returned with a notification type CONFIG_NIT. Subsequent changes are reported with type CONFIG_CREATE or CONFIG_DELETE.

cancelNotify

A client uses this method to cancel registration for managed object configuration notifications associated with a specified client application.

getPersistent

A client may use this method to retrieve the set of attribute codes (SeqAttrCode) identifying all "persistent" data maintained by this service object. Values for persistent attributes of each managed object instance are stored and kept current irrespective of any client requests.

getAttrSpec

A client may use this method to retrieve the name and codes of all attributes defined for a target service class (currently used for debugging only).

getKeySpec

A client may use this method to retrieve the set of codes (SeqAttrCode) identifying the attribute(s) which represents the logical identifier(s) of any instance of the target class.

viewStatus

A client may invoke this method to obtain the EMS view of the current values for a specified set of persistent attributes for a specified managed object instance.

getStatus

A client may use this method to register for a snapshot of current status information. This interface differs from the previous one in that the requested attribute list may specify any managed object attribute codes—not just those associated with persistent data, and the information is returned via client status callback (StatusCB).

startUpdate

A client may also register for an initial view and notification of any updates to a list of selected attributes for a specified managed object instance. In this case, an initial view is reported via client callback with a notification type STATUS_INIT. Subsequent changes are reported with type STATUS_CHANGE. Note that managed object instance deletions are reported only through configuration change notification to avoid a potential flurry of client status callbacks when a network element is unequipped.

stopUpdate

A client uses this method to cancel registration for managed object status updates associated with a specified client application.

getInst

A client may use this method to obtain a managed object instance identifier for a specified network element instance id and managed object key list.

Note that each method requires a client session application identifier (SessionAppId) to validate user access. In the case of configuration or status change notification registration, this identifier is also used to keep track of the additional server resources utilized while the client application is active.

Refer to the description of interfaces MO, ConfigCB & StatusCB in the attachment for additional details.

Network Element Level Managed Objects

Each network-element level managed object must also implement the NEMO interface which defines additional network-element level configuration services:

viewNEconfig

A client may invoke this method to obtain the current EMS view of the network element configuration.

notifyNEconfig

A client may also register for an initial view of network element-level managed object configuration information and notification of subsequent changes via callback. The initial view is returned with a notification type CONFIG_INIT. Subsequent changes are reported with type CONFIG_CREATE or CONFIG_DELETE.

cancelNEnotify

A client application should use this method to cancel registration for network element managed object configuration updates.

getNEinst

A client may invoke this method to retrieve the NEMO instance identifier of the network element associated with a specified logical id.

getLogicalId

A client may invoke this method to retrieve the logical identifier of the network element associated with a specified NEMO instance id.

getContainment

A client may invoke this method to obtain a sequence of containment information for the target NEMO, where each entry in the sequence contains the name, class code and CORBA reference to a contained service class object.

Note that each method requires a client session application identifier to validate user access. In the case of configuration change notification registration, this identifier is also used to keep track of the additional server resources utilized while the client application is active.

Refer to the description of interfaces NEMO & NEconfigCB in the attachment for additional details.

Descriptive Entity Objects

Application objects of this type are defined to provide type and attribute information for abstract entities, such as data communicated between the EMS and network elements which are not part of a managed object description (e.g. SNMP trap definitions and command groups). Descriptive entity objects provide no implementation—they are defined in application-specific IDL and known by client applications at compile time.

Event Distributor

An event is reported as a combination of the following:
1. A header, which contains information of most general interest:
    Time of the event
    Event category defined to be one of the following:
        Alarm Set
        Alarm Clear
        Command Acknowledgment
        Command Response
        Configuration Change
        Informational Message
        Initialization
        State Change
    Network element object identifier
    Network element alarm level—meaningful only for alarm set
    Maintenance unit object identifier (if applicable)
    Maintenance unit alarm level—meaningful only for alarm set
    A command identifier (CmdId) defined as a user session id & command sequence number—meaningful only for command acknowledgment & response
2. Event data defined as a sequence of structures which contain:
    A ClassCode of a managed object, network element or descriptive entity
    A sequence of attribute code-value pairs Client applications may request a copy of the event stream, as processed by the event distributor, filtered on information specified in the event header. Filter wildcards are implemented with "out-of-band" values:
    Any Category
    Any Class
    Any Instance
    Any Alarm
    Any Cmd The table in FIG. 8 summarizes which filter criteria are valid for each event category:

The event distributor processes filters by examining the specified category and AND'ing together valid criteria. Clients may simulate OR operations by registering multiple filters.

The EvtDist service object implements the following client interfaces:

RegisterFilter

A client uses this method to register an event filter. A filter identifier is returned.

CancelFilter

A client invokes this method to remove a specified event filter, using the filter id returned from the associated registration.

Note that each method requires a client session application identifier to validate user access.

Refer to the description of interfaces EvtDist & EventCB in the attachment for additional details.

Alarm Manager

Alarm information is reported as a sequence of AlarmData structures which contain:
    The ClassCode of a managed object which defines a network-element specific alarm record.
    Note that in the first release of the EMS, only one network element active alarm table is defined (ApActiveAlarms).
    A sequence of alarm records, each of which contains an alarm instance identifier and sequence of attribute code-value pairs.

Client applications may request a copy of all active alarms filtered on any combination of the following:
    Network element
    Maintenance unit
    Alarm level
    Similar to the interfaces provided by the event distributor, out-of-band values may be used to represent wildcards.

Since managed object instance information may not be available at the time an alarm is reported, the actual alarm filter criteria are specified in terms of logical identifiers. Logical ids are integer values which represent the logical numbers of devices and interfaces (e.g. AP 4). The correlation between logical ids and managed object instance identifiers is provided in the configuration information made available by each managed object service object, and through the utility method getInst. Refer to the section on Managed Objects for additional details.

The following AlarmManager client interfaces are written specifically for the Active Alarm List application:

RequestAlarms

A client invokes this method to register a filter for active alarms.

ChangeFilter

A client may invoke this method to change filter criteria.

RefreshAlarms

A client may invoke this method to refresh the active alarm list.

CancelAlarms

A client should invoke this method to de-register a filter.

All operations except for de-registration return all active alarms filtered on the specified criteria. Also, each of these methods requires a valid client session application identifier to validate user access, and to keep track of the additional server resources which may be utilized while each client is active.

The following AlarmManager interface may be used by any client application (e.g. CLI):

opAlarm

Through client implementations of event callbacks used to process command acknowledgements and responses (the same EventCB reference may be used in both cases), this method returns either a list of all active alarms in the system or just those associated with a target network element.

Refer to the description of interfaces AlarmManager, AlarmCB & EventCB in the attachment for additional details.

Exceptions

Exceptions are used for consistent and structured error handling in both the EM Server and Client.

The CORBA specification defines many system exceptions:

BAD_PARAM
INV_OBJREF
NO_PERMISSION
BAD_OPERATION
OBJ_ADAPTER
♦♦♦

Refer to "The Common Object Request Broker: Architecture and Specification" for an exhaustive list of mnemonics and the associated exception descriptions.

Vendor-specific object request broker exceptions are also defined (using the Minor identifier of the SystemException):

NO_IT_DAEMON_PORT
LICENCE_EXPIRED
♦♦♦

Currently, the EMS uses Iona's Orbix product. Refer to the "Orbix 2.3c Reference Guide" for an exhaustive list of mnemonics and the associated exception descriptions.

In most cases, exceptions will be treated as fatal errors by Client code resulting in application termination.

An interface 26-specific exception is also defined as an Exception Code containing one of the following values shown in FIG. 9.

GLOSSARY

Alarm The description of an alarmed notification.
Attribute A property of a managed object (e.g. alarm state).
Attribute Code An integer value which uniquely identifies an attribute of a given managed object.
Class Code An integer value which uniquely identifies a managed object class.
Configuration Generic term which has one of two meanings depending on its context:
Information With respect to a managed object class, this term applies to the identification of all instances of the class, either for a specific network element or for all network elements in the system. With respect to a managed object instance, this term may apply to one or more attributes which are associated with database values, such as the primary/alternate role of a duplex component.
CORBA Common Object Request Broker Architecture
EMAPI Element Management Application Programming Interface
EMS Element Management System
Event The description of a spontaneous occurrence, such as alarm notification, command acknowledgment or configuration change.
Instance Identifier An integer value which uniquely identifies an instance of a given managed object.
Interface Operation Generic term for distributed service request. The target method may be defined in the Element Management Application Programming Interface (e.g. status registration) or in an application-specific derivation of a managed object (e.g. command execution).
Logical Identifier An integer value which represents the logical number of a device or interface (e.g. AP 4). Note that there is no direct correlation between a logical id and instance id.
Managed Object An abstract representation of a physical or logical resource which may be managed by the EMS (e.g. network element, maintenance unit, data link).
ORB Object Request Broker
Object Identifier The combination of managed object class code and instance identifier which uniquely identifies any managed object instance in the system.
Persistent Attribute Information stored and kept current irrespective of any client request (e.g. maintenance state).
Service Object Any EM Server object which provides services to client applications.
Session Each client must establish a session at initialization—for which a unique session identifier is assigned—that will be used to validate access permissions, to correlate client requests and to keep track of Server resources utilized in behalf of any applications associated with the session.
Status Information Current attribute values for a managed object instance.

What is claimed is:

1. In a network having a network element, a method for controlling the network element from a remote work station connectable to the network, the method comprising the steps of:

polling the network element, through employment of an object server, for only particular one or more attributes for which one or more distributed clients have registered interest and only once during an instance of a polling interval regardless of whether the one or more distributed clients comprise a plural number of clients, wherein the particular one or more attributes comprise a subset of a plurality of attributes for the network element, running an object oriented program at the remote work station to control an object associated with the network element, translating interface operations generated by the work station during the running of the object oriented program to corresponding translated interface operations in an object oriented language associated with the object, and connecting the corresponding translated interface operations through the network to the object server to control the object associated with the network element in accordance with the translated interface operations.

2. The method of claim 1, wherein the step of polling the network element, through employment of the object server, for only the particular one or more attributes for which the one or more distributed clients have registered interest and only once during an instance of the polling interval regardless of whether the one or more distributed clients comprise a plural number of clients comprises the steps of:

notifying, through employment of the object server, the one or more distributed clients that have registered interest for the particular one or more attributes of a first view of the particular one or more attributes of the network element in a first instance of the polling interval;

notifying, through employment of the object server, the one or more distributed clients that have registered interest for the particular one or more attributes of a different view of a first one or more of the particular one or more attributes of the network element in an instance of the polling interval that is consecutive to the first instance of the polling interval upon a change of the first one or more of the particular one or more attributes; and withholding notification, from the object server, to the one or more distributed clients that have registered interest for the particular one or more attributes of a same view of a second one or more of the particular one or more attributes of the network element in an instance of the polling interval that is consecutive to the first instance of the polling interval upon an occurrence of unchanged value of the second one or more of the particular one or more attributes from the first instance of the polling interval to the instance of the polling interval that is consecutive to the first instance of the polling interval.

3. The method of claim 1 including the step of reporting changes in one or more of the particular one or more attributes when the one or more distributed clients request notification of changes in the one or more of the particular one or more attributes.

4. The method of claim 1, wherein the one or more distributed clients comprise a plural number of clients, the method including the steps of:
polling for the particular one or more attributes for the plural number of clients, and
reporting changes in the particular one or more attributes to one of the plural number of clients requesting notification of changes in the particular one or more attributes.

5. The method of claim 1, wherein the network comprises a plurality of network elements, and wherein the step of polling the network element, through employment of the object server, for only the particular one or more attributes for which the one or more distributed clients have registered interest and only once during an instance of the polling interval regardless of whether the one or more distributed clients comprise a plural number of clients includes the step of:
polling each of the plurality of network elements, through employment of an object server, for only particular one or more attributes for which one or more distributed clients have registered interest in the particular network element and only once for each of the plurality of network elements during an instance of a polling interval regardless of whether the one or more distributed clients comprise a plural number of clients, wherein the particular one or more attributes for each of the plurality of network elements comprise a subset of a plurality of attributes for the particular network element.

6. The method of claim 1, wherein the one or more distributed clients comprise a plural number of clients, the method including the step of asynchronously reporting changes in the particular one or more attributes to the plural number of clients.

7. The method of claim 1 in which the object oriented program is a JAVA program.

8. The method of claim 7 in which a CORBA architecture functions as an IPC for functions residing on the object server to provide for distribution of functionality to multiple work station processors.

9. The method of claim 1 in which the network element and the object server communicate through use of a network management protocol.

10. The method of claim 9 wherein the network management protocol is the simple network management protocol.

11. The method of claim 9 including the step of obtaining system status associated with the network element by polling and auditing pursuant to the simple network management protocol.

12. The method of claim 9 including the step of providing real-time notification of alarm conditions at the network element through the use of a network management protocol event manager.

13. The method of claim 9 including the step of providing command and control signals to the network element through use of a simple network management protocol set operation.

14. The method of claim 1 wherein
the object server is part of an element management server that also includes a web server, the method including the step of
displaying command and alarm output information from the network element as a web browser-based display through use of the web server.

15. The method of claim 14 in which
the element management server also includes an executive control processor, the method including the step of sending the command and alarm output information from the network element to the executive control processor.

16. The method of claim 1 including the step of sending event and alarm notifications from the network element to the object server through use of a network management protocol.

17. The method of claim 16 including the step of issuing commands to obtain input information from the work station from the network element to the object server through the use of the network management protocol.

18. In a network having a network element located at a node of the network, a method for controlling the network element from a remote work station connectable to the network, the method comprising the steps of:
polling the network element, through employment of an object server, for only particular one or more attributes for which one or more distributed clients have registered interest and only once during an instance of a polling interval regardless of whether the one or more distributed clients comprise a plural number of clients, wherein the particular one or more attributes comprise a subset of a plurality of attributes for the network element,
running an object oriented program at the remote work station to control an object associated with the network element,
translating interface operations generated by the work station during the running of the object oriented program to corresponding translated interface operations in an object oriented language associated with the object, wherein the translating includes receiving the interface operations through a communication link of the network at a node separate from the node where the network element is located and translating the interface operations through the network communication link into the corresponding translated interface operations by conveying the received interface operations into IPC and TCP/IP requests, and
connecting the corresponding translated interface operations through the network to the object server to control the object associated with the network element in accordance with the translated interface operations.

19. The method of claim 18, wherein the step of polling the network element, through employment of the object server, for only the particular one or more attributes for which the one or more distributed clients have registered interest and only once during an instance of the polling interval regardless of whether the one or more distributed clients comprise a plural number of clients comprises the steps of:

notifying, through employment of the object server, the one or more distributed clients that have registered interest for the particular one or more attributes of a first view of the particular one or more attributes of the network element in a first instance of the polling interval;

notifying, through employment of the object server, the one or more distributed clients that have registered interest for the particular one or more attributes of a different view of a first one or more of the particular one or more attributes of the network element in an instance of the polling interval that is consecutive to the first instance of the polling interval upon a change of the first one or more of the particular one or more attributes; and withholding notification, from the object server, to the one or more distributed clients that have registered interest for the particular one or more attributes of a same view of a second one or more of the particular one or more attributes of the network element in an instance of the polling interval that is consecutive to the first instance of the polling interval upon an occurrence of unchanged value of the second one or more of the particular one or more attributes from the first instance of the polling interval to the instance of the polling interval that is consecutive to the first instance of the polling interval.

20. The method of claim 18 including the step of reporting changes in one or more of the particular one or more attributes when the one or more distributed clients request notification of changes in the one or more of the particular one or more attributes.

21. The method of claim 18, wherein the one or more distributed clients comprise a plural number of clients, the method including the steps of:

polling for the particular one or more attributes for the plural number of clients, and reporting changes in the particular one or more attributes to one of the plural number of clients requesting notification of changes in the particular one or more attributes.

22. The method of claim 18, wherein the network comprises a plurality of network elements, and wherein the step of polling the network element, through employment of the object server, for only the particular one or more attributes for which the one or more distributed clients have registered interest and only once during an instance of the polling interval regardless of whether the one or more distributed clients comprise a plural number of clients includes the step of:

polling each of the plurality of network elements, through employment of an object server, for only particular one or more attributes for which one or more distributed clients have registered interest in the particular network element and only once for each of the plurality of network elements during an instance of a polling interval regardless of whether the one or more distributed clients comprise a plural number of clients, wherein the particular one or more attributes for each of the plurality of network elements comprise a subset of a plurality of attributes for the particular network element.

23. The method of claim 18, wherein the one or more distributed clients comprise a plural number of clients, the method including the step of asynchronously reporting changes in the particular one or more attributes to the plural number of clients.

24. The method of claim 18 in which the object oriented program is a JAVA program.

25. The method of claim 18 in which the step of connecting includes the step of transmitting the IPC and TCP/IP requests to the object server.

26. The method of claim 25 in which the step of connecting includes the step of generating the IPC and TCP/IP requests through a web-based GUI.

27. The method of claim 25 including the steps of storing network element information concerning the network at the element management server, and selectively providing the stored network element information to a plurality of different work stations.

28. The method of claim 18 in which a CORBA architecture functions as an IPC for functions residing on the object server to provide for distribution of functionality to multiple work station processors.

29. The method of claim 18 in which the network element and the object server communicate through use of a network management protocol.

30. The method of claim 29 wherein the network management protocol is the simple network management protocol.

31. The method of claim 29 including the step of obtaining system status associated with the network element by polling and auditing pursuant to the simple network management protocol.

32. The method of claim 29 including the step of providing real-time notification of alarm conditions at the network element through the use of a network management protocol event manager.

33. The method of claim 29 including the step of providing command and control signals to the network element through use of a simple network management protocol set operation.

34. The method of claim 18 in which the object server is part of an element management server that also includes a web server, the method including the step of displaying command and alarm output information from the network element as a web browser-based display through use of the web server.

35. The method of claim 34 in which the element management server also includes an executive control processor, the method including the step of sending the command and alarm output information from the network element to the executive control processor.

36. The method of claim 18 including the step of sending event and alarm notifications from the network element to the object server through use of a network management protocol.

37. The method of claim 36 including the step of issuing commands to obtain input information from the work station from the network element to the object server through the use of the network management protocol.

38. In a network having a network element, a method for controlling the network element from a remote work station connectable to the network, the method comprising the steps of:

polling the network element, through employment of an object server, for only particular one or more attributes for which one or more distributed clients have registered interest and only once during an instance of a polling interval regardless of whether the one or more distributed clients comprise a plural number of clients, wherein the particular one or more attributes comprise a subset of a plurality of attributes for the network element, running an object oriented program at the remote work station to control an object associated with the network element, translating interface operations generated by the work station during the running of the object oriented program to corresponding translated interface operations in an object oriented language associated with the object, connecting the corresponding translated interface operations through the network to the object server to control the object associated with the network element in accordance with the translated interface operations, and gathering information concerning the network element at the object server, and conveying the information that has been gathered to the remote work station by dynamically generating a web-page visual display associated with the network element for interfacing with the remote work station to display the information that has been gathered.

39. The method of claim 38, wherein the step of polling the network element, through employment of the object server, for only the particular one or more attributes for which the one or more distributed clients have registered interest and only once during an instance of the polling interval regardless of whether the one or more distributed clients comprise a plural number of clients comprises the steps of:

notifying, through employment of the object server, the one or more distributed clients that have registered interest for the particular one or more attributes of a first view of the particular one or more attributes of the network element in a first instance of the polling interval;

notifying, through employment of the object server, the one or more distributed clients that have registered interest for the particular one or more attributes of a different view of a first one or more of the particular one or more attributes of the network element in an instance of the polling interval that is consecutive to the first instance of the polling interval upon a change of the first one or more of the particular one or more attributes; and withholding notification, from the object server, to the one or more distributed clients that have registered interest for the particular one or more attributes of a same view of a second one or more of the particular one or more attributes of the network element in an instance of the polling interval that is consecutive to the first instance of the polling interval upon an occurrence of unchanged value of the second one or more of the particular one or more attributes from the first instance of the polling interval to the instance of the polling interval that is consecutive to the first instance of the polling interval.

40. The method of claim 38 including the step of reporting changes in one or more of the particular one or more attributes when the one or more distributed clients request notification of changes in the one or more of the particular one or more attributes.

41. The method of claim 38, wherein the one or more distributed clients comprise a plural number of clients, the method including the steps of:

polling for the particular one or more attributes for the plural number of clients, and reporting changes in the particular one or more attributes to one of the plural number of clients requesting notification of changes in the particular one or more attributes.

42. The method of claim 38, wherein the network comprises a plurality of network elements, and wherein the step of polling the network element, through employment of the object server, for only the particular one or more attributes for which the one or more distributed clients have registered interest and only once during an instance of the polling interval regardless of whether the one or more distributed clients comprise a plural number of clients includes the step of:

polling each of the plurality of network elements, through employment of an object server, for only particular one or more attributes for which one or more distributed clients have registered interest in the particular network element and only once for each of the plurality of network elements during an instance of a polling interval regardless of whether the one or more distributed clients comprise a plural number of clients, wherein the particular one or more attributes for each of the plurality of network elements comprise a subset of a plurality of attributes for the particular network element.

43. The method of claim 38, wherein the one or more distributed clients comprise a plural number of clients, the method including the step of asynchronously reporting changes in the particular one or more attributes to the plural number of clients.

44. The method of claim 38 in which the object oriented program run at the remote work station is a JAVA program.

45. The method of claim 38 in which the step of gathering includes the step of gathering network element information concerning at least one of a list of all active alarms, a summary of system alarms, and a detailed indication of the stat of the network element.

46. The method of claim 45 in which the step of gathering includes the step of selectively gathering a list of all active alarms, a summary of system alarms, and a detailed indication of the status of the network element.

47. The method of claim 38 in which a CORBA architecture functions as an IPC for functions residing on the object server to provide for distribution of functionality to multiple work station processors.

48. The method of claim 38 in which communication between the network element and the object server is through use of a network management protocol.

49. The method of claim 48 wherein the network management protocol is simple network management protocol.

50. The method of claim 48 including the step of obtaining system status associated with the network element by polling and auditing pursuant to simple network management protocol.

51. The method of claim 48 including the step of providing real-time notification of alarm conditions at the network element through the use of a network management protocol event manager.

52. The method of claim 48 including the step of providing command and control signals to the network element through use of a simple network management protocol set operation.

53. The method of claim 38 in which the object server is part of an element management server that includes a web server, the method including the step of displaying command and alarm output information from the network element as a web browser-based display through use of the web server.

54. The method of claim 53 in which the element management server includes an executive control processor, the method including the step of sending the command and alarm output information from the network element to the executive control processor.

55. The method of claim 38 including the step of sending event and alarm notifications from the network element to the object server through use of a network management protocol.

56. The method of claim 55 including the step of issuing commands to obtain input information from the work station from the network element to the object server through the use of the network management protocol.

57. In a network having a network element, a method for controlling the network element from a remote work station connectable to the network, the method comprising the steps of:

polling the network element, through employment of an object server, for only particular one or more attributes for which one or more distributed clients have registered interest and only once during an instance of a polling interval regardless of whether the one or more distributed clients comprise a plural number of clients, wherein the particular one or more attributes comprise a subset of a plurality of attributes for the network element, running an object oriented program at the remote work station to control an object associated with the network element, translating interface operations generated by the work station during the running of the object oriented program to corresponding translated interface operations in an object oriented language associated with the object, and connecting the corresponding translated interface operations through the network to the object server to control the object associated with the network element in accordance with the translated interface operations, wherein the translating includes communicating with the object server through a distributed object request architecture to provide a consistent interface to the object that hides implementation details associated with the object.

58. The method of claim 57, wherein the step of polling the network element, through employment of the object server, for only the particular one or more attributes for which the one or more distributed clients have registered interest and only once during an instance of the polling interval regardless of whether the one or more distributed clients comprise a plural number of clients comprises the steps of:

notifying, through employment of the object server, the one or more distributed clients that have registered interest for the particular one or more attributes of a first view of the particular one or more attributes of the network element in a first instance of the polling interval;

notifying, through employment of the object server, the one or more distributed clients that have registered interest for the particular one or more attributes of a different view of a first one or more of the particular one or more attributes of the network element in an instance of the polling interval that is consecutive to the first instance of the polling interval upon a change of the first one or more of the particular one or more attributes; and withholding notification, from the object server, to the one or more distributed clients that have registered interest for the particular one or more attributes of a same view of a second one or more of the particular one or more attributes of the network element in an instance of the polling interval that is consecutive to the first instance of the polling interval upon an occurrence of unchanged value of the second one or more of the particular one or more attributes from the first instance of the polling interval to the instance of the polling interval that is consecutive to the first instance of the polling interval.

59. The method of claim 57 including the step of reporting changes in one or more of the particular one or more attributes when the one or more distributed clients request notification of changes in the one or more of the particular one or more attributes.

60. The method of claim 57, wherein the one or more distributed clients comprise a plural number of clients, the method including the steps of:

polling for the particular one or more attributes for the plural number of clients, and reporting changes in the particular one or more attributes to one of the plural number of clients requesting notification of changes in the particular one or more attribute.

61. The method of claim 57, wherein the network comprises a plurality of network elements, and wherein the step of polling the network element, through employment of the object server, for only the particular one or more attributes for which the one or more distributed clients have registered interest and only once during an instance of the polling interval regardless of whether the one or more distributed clients comprise a plural number of clients includes the step of:

polling each of the plurality of network elements, through employment of an object server, for only particular one or more attributes for which one or more distributed clients have registered interest in the particular network element and only once for each of the plurality of network elements during an instance of a polling interval regardless of whether the one or more distributed clients comprise a plural number of clients, wherein the particular one or more attributes for each of the plurality of network elements comprise a subset of a plurality of attributes for the particular network element.

62. The method of claim 57, wherein the one or more distributed clients comprise a plural number of clients, the method including the step of asynchronously reporting changes in the particular one or more attributes to the plural number of clients.

63. The method of claim 52 in which the object oriented program run at the remote work station is a JAVA program.

64. The method of claim 57 in which the distributed object request architecture is a CORBA architecture.

65. The method of claim 64 in which the CORBA architecture functions as an IPC for functions residing on the object server to eliminate a need for platform specific language for the object oriented program at the remote work station.

66. The method of claim 65 in which the CORBA architecture functions as an IPC for functions residing on the object server to provide for distribution of functionality to multiple work station processors.

67. The method of claim 57 in which communication between the network element and the object server is through use of a network management protocol.

68. The method of claim 67 wherein the network management protocol is the simple network management protocol.

69. The method of claim 68 including the step of obtaining system status associated with the network element by polling and auditing pursuant to simple network management protocol.

70. The method of claim 67 including the step of providing real-time notification of alarm conditions at the network element through the use of a network management protocol event manager.

71. The method of claim 67 including the step of providing command and control signals to the network element through use of a simple network management protocol set operation.

72. The method of claim 57 in which
the object server is part of an element management server that also includes a web server, the method including the step of
displaying command and alarm output information from the network element as a web browser-based display through use of the web server.

73. The method of claim 72 in which
the element management server also includes an executive control processor, the method including the step of
sending the command and alarm output information from the network element to the executive control processor.

74. The method of claim 57 including the step of sending event and alarm notifications from the network element to the object server through use of a network management protocol.

75. The method of claim 74 including the step of issuing commands to obtain input information from the work station from the network element to the object server through the use of the network management protocol.

* * * * *